United States Patent
Coffman et al.

(10) Patent No.: US 6,675,238 B1
(45) Date of Patent: Jan. 6, 2004

(54) EACH OF A PLURALITY OF DESCRIPTORS HAVING A COMPLETION INDICATOR AND BEING STORED IN A CACHE MEMORY OF AN INPUT/OUTPUT PROCESSOR

(75) Inventors: Jerrie L. Coffman, Beaverton, OR (US); Arlin R. Davis, Yamhill, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/390,041

(22) Filed: Sep. 3, 1999

(51) Int. Cl.[7] .................................. G06F 3/00
(52) U.S. Cl. .................. 710/46; 710/5; 710/10
(58) Field of Search ................ 710/22–24, 46, 710/47, 52, 54, 5, 15, 19, 26; 370/412–414, 428, 429

(56) References Cited

U.S. PATENT DOCUMENTS

| | | | | |
|---|---|---|---|---|
| 5,594,862 A | * | 1/1997 | Winkler et al. ................ | 714/5 |
| 5,606,665 A | * | 2/1997 | Yang et al. .................. | 711/154 |
| 5,745,790 A | * | 4/1998 | Oskouy ....................... | 710/33 |
| 5,751,951 A | * | 5/1998 | Osborne et al. ............. | 709/250 |
| 5,828,901 A | * | 10/1998 | O 'Toole et al. ............. | 710/22 |
| 6,006,275 A | * | 12/1999 | Picazo et al. ................ | 370/351 |
| 6,031,843 A | * | 2/2000 | Swanbery et al. ........... | 370/422 |
| 6,049,842 A | * | 4/2000 | Garrett et al. ................ | 710/33 |
| 6,070,219 A | * | 5/2000 | McAlpine et al. ........... | 370/230 |
| 6,333,929 B1 | * | 12/2001 | Drottar et al. .............. | 370/362 |
| 6,351,474 B1 | * | 2/2002 | Robinett et al. ............ | 370/468 |

* cited by examiner

*Primary Examiner*—Ilwoo Park
(74) *Attorney, Agent, or Firm*—Kenyon & Kenyon

(57) ABSTRACT

An apparatus and method for efficient input/output processing without the use of interrupts is described. The apparatus includes a plurality of descriptors where each descriptor includes a completion indicator and data associated with an input/output request. The plurality of descriptors includes a head descriptor and a tail descriptor. The apparatus further include a plurality of address holders associated with an input/output processor, and each the plurality of address holders is uniquely affiliated with one of the plurality of descriptors. The apparatus further include a polling mechanism for evaluating the completion indicator of the head descriptor and a completion processor for interfacing with the head descriptor. Finally, the apparatus includes connectors between the tail descriptor and address holder and between the input/output processor and the head descriptor.

17 Claims, 2 Drawing Sheets

Figure 1:
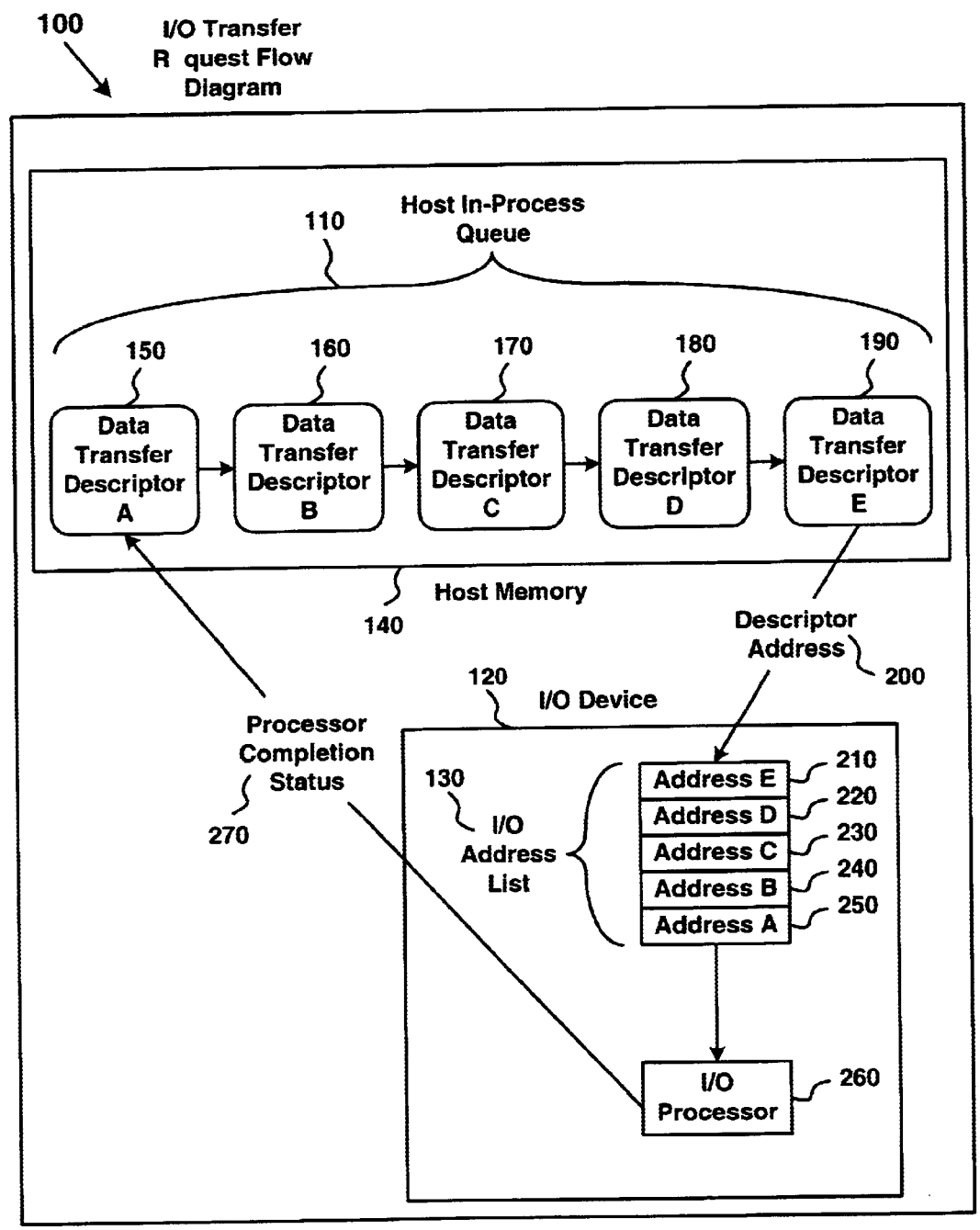

EACH OF A PLURALITY OF DESCRIPTORS HAVING A COMPLETION INDICATOR AND BEING STORED IN A CACHE MEMORY OF AN INPUT/OUTPUT PROCESSOR

BACKGROUND

The present invention describes a method and apparatus by which interrupts may be eliminated in a pipelined computer system using a communication system and a polling system to efficiently utilize computer time and memory usage.

Modern microprocessor instruction execution involves the use of a series of discrete stages called a "pipeline" to break problems into logically organized pieces. By executing processes on a pipeline, the processor (e.g., a "CPU") can work on several different problems at once, thus greatly increasing the rate of process completion.

In prior art systems, input/output ("I/O") requests are not processed in the normal CPU pipeline system. Instead, pending I/O processes obtain the attention of the CPU by signaling an interrupt, which causes the CPU to stop whatever process it is currently executing in order to address the needs of the pending I/O process. When an interrupt is signaled, a "context switch" is triggered which forces the CPU to save its current status to registers and non-local memory before processing the pending I/O request. After the CPU processes the pending I/O request, the status of the CPU that existed prior to the interrupt is retrieved from the registers and non-local memory and the CPU resumes processing using the normal pipeline system. These context switches result in a significant amount of execution time loss because they force the CPU to spend time in memory access and force the operating system ("OS") to reschedule other active processes to make room for I/O completion processing. Furthermore, typical I/O completion processing uses slow, non-cacheable memory-mapped registers located on I/O adapters across an I/O expansion bus, thus loading the system and I/O buses with further overhead.

Consequently, there is a need in the art for a method and apparatus of I/O process completion that does not require an interruption in the normal activities of the OS, the processor pipeline, or the system and I/O buses.

SUMMARY

Embodiments of the present invention provide for an apparatus for input/output processing that includes a plurality of descriptors where each descriptor includes a completion indicator and data associated with an input/output request. The plurality of descriptors includes a head descriptor and a tail descriptor. Embodiments of the present invention further include a plurality of address holders associated with an input/output processor, and each the plurality of address holders is uniquely affiliated with one of the plurality of descriptors. Embodiments of the present invention further include a polling mechanism for evaluating the completion indicator of the head descriptor and a completion processor for interfacing with the head descriptor. Finally, embodiments of the present invention include connectors between the tail descriptor and address holder and between the input/output processor and the head descriptor.

BRIEF DESCRIPTIONS OF THE DRAWINGS

FIG. 1 details an apparatus of an I/O transfer request flow mechanism.

Figure 2:
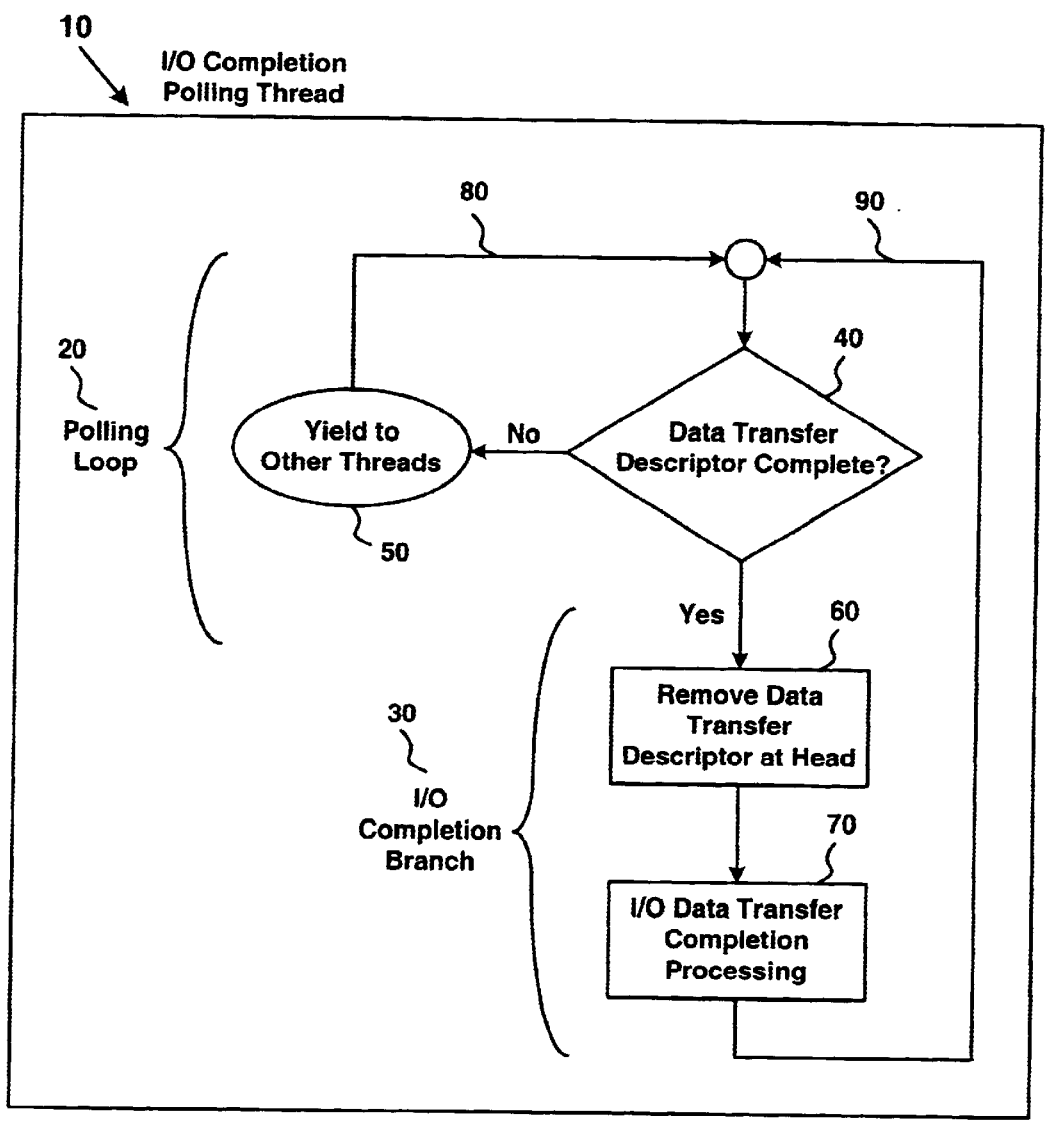

FIG. 2 details a flowchart of an I/O completion polling thread algorithm.

DETAILED DESCRIPTION

The present invention solves the problem of pipeline disruption via I/O interrupts by utilizing a communications system and a software polling system to efficiently utilize time and memory allocated to I/O completion processing.

An I/O transfer request flow diagram 100 illustrating the performance of software polling in accordance with an embodiment of the present invention is shown in FIG. 1. FIG. 1 illustrates a host memory 140 including a host-in-process queue 110 containing a plurality of data transfer descriptors 150, 160, 170, 180, 190 arranged in linked list format from the head data transfer descriptor 150 to the tail data transfer descriptor 190. The host memory 140 may contain a kernel mode device driver.

FIG. 1 also illustrates an I/O device 120 including an I/O processor 260 and an I/O address list 130 with a plurality of addresses 210, 220, 230, 240, 250 arranged in a first-in-first-out ("FIFO") format. The I/O address list 130 may consist of memory mapped registers and is arranged in a FIFO format such that the I/O processor 260 first processes the address 250 that has been in the I/O address list 130 the longest before processing the address 240 that has been in the I/O address list the second longest, and so on throughout the addresses 210–250. The addresses 210–250 operate as pointers because their values represent locations in the host memory 140 where their corresponding data transfer descriptors 150–190 may be found.

The I/O address list 130 may receive via connector 200 new addresses 210 that correspond to the most recently added data transfer descriptor 190 to the host-in-process queue. Additionally, once the I/O processor 260 completes processing the first address 250 in the I/O address list, the I/O processor 260 may update its corresponding data transfer descriptor 150 via connector 270 to indicate that the processing of the information in the first data transfer descriptor is complete.

To begin an I/O request, the CPU builds a data transfer descriptor 190 that contains all of the information the I/O device 120 needs to process the I/O request. Such information may include the type of I/O device utilized, the nature of the data required to be input into or output from the CPU, the length and address of the data on which the I/O will operate, the address of the next data transfer descriptor 210 in the host in-process queue 110 and any other pertinent information. The data transfer descriptor 190 also includes an indicator for determining whether the CPU's I/O request has been completed or not. The data transfer descriptors 150–190 are located within the host memory 140. The host memory 140 may be located within the main CPU memory, which would allow the CPU to take full advantage of CPU caching and limit the amount of system bus traffic generated during I/O completion checking.

After the CPU builds a new data transfer request 190, the host in-process queue 110 chains the data transfer descriptor 190 on the tail of the next preexisting data transfer descriptor 180. Subsequently, the host in-process queue 110 writes the memory address of the new data transfer descriptor 190 in the last address 210 of the I/O address list 130.

The operation of the I/O device 120 is triggered by the presence of addresses 210–250 in the I/O address list 130. Running concurrently with the CPU's creation of data transfer descriptors 150–190, the I/O device 120 removes the first data transfer descriptor address 250 from the I/O address list. The I/O processor 260 subsequently accesses the data transfer descriptor 150 located at the first data transfer descriptor address 250. When the I/O processor 260 completes the I/O operation as directed by the data transfer descriptor 150, the I/O device 120 updates a field in the data transfer descriptor 150 via connector 270 to indicate that the I/O transaction is complete. The I/O device 120 continues processing the next address 240 in the I/O address list 130 in the same manner until the I/O address list 130 is empty or a server error occurs.

An I/O transfer completion polling thread 10 illustrating the performance of software polling in accordance with an embodiment of the present invention is shown in FIG. 2. The I/O transfer completion polling thread 10 may be a kernel thread created by a host device driver to provide the necessary polling time slice and system task load balancing. The I/O transfer completion polling thread 10 consists of a polling loop 20 and an I/O completion branch 30. The polling loop 20 determines whether the I/O operation detailed in the data transfer descriptor 150 at the head of the host in-process queue 110 has been completed by the I/O processor 260 (Step 40). If the I/O operation detailed in the data transfer descriptor 150 is not present, or is not complete, the polling loop 20 yields to other system threads running in the CPU (Step 50) until it is rescheduled by the OS (Step 80).

If the I/O operation detailed in the head data transfer descriptor 150 is present and is complete (Step 40), the I/O completion branch 30 is chosen. The CPU then removes the data transfer descriptor 150 from the head of the host in-process queue 110 (Step 60) and performs any necessary I/O completion processing (Step 70) prompted by the result of the I/O request found in the data transfer descriptor 150. The I/O completion branch 30 concludes (Step 90) by returning to the polling loop 20 to determine whether the I/O operation detailed in the next data transfer descriptor 160 in the host in-process queue is present and is complete (Step 40).

In one embodiment of the present invention, the Next Generation I/O ("NGIO") communication interface may be utilized for implementing the I/O completion polling thread 10. NGIO guarantees that completed data transfer descriptors 150–190 will appear at the head of the host in-process queue 110, thereby saving search time when the polling thread 10 is ready to remove the head data transfer descriptor 150.

The software polling, as implemented by the present invention, makes the CPU more efficient in a number of ways. First, software polling provides an I/O communication mechanism that significantly decreases both system and I/O bus overhead by polling in cacheable memory space, which is significantly faster than the non-cacheable memory used in the prior art context switching system. This is because the host memory 140, which contains the host in-process queue 110 may be placed in the main, cacheable CPU memory. Second, software polling eliminates the need to service interrupts for I/O devices, thus allowing the CPU to devote more time to efficiently executing processes on a pipeline. Third, the software polling, because it runs at the same priority level as applications, allows the CPU to perform other tasks when there are no I/O transfers to complete. Fourth, software polling provides the capability for efficient multi-threaded processing that can direct I/O completion to the CPU that initiated the I/O request. Multiple software polling threads 10 can run simultaneously and the distribution of these threads are managed based on the number of system CPUs. Completing the I/O on the CPU that initiated the request increases the probability that the process context data is still in the relatively fast CPU cache, resulting in greater system performance.

Accordingly, the present invention allows for the efficient processing of I/O requests for a CPU executing a pipeline of instructions. It will be appreciated by those skilled in the art that the specific embodiments disclosed above may be readily utilized as a basis for modifying or designing other methods and techniques for carrying out the same purposes of the present invention. It should also be realized by those skilled in the art that such equivalent constructions do not depart from the spirit and scope of the invention as set forth in the following claims.

We claim:

1. An apparatus for input/output processing, comprising:
   a host including a plurality of descriptors stored in a cache memory of an input/output processor, the plurality of descriptors including a head descriptor and a tail descriptor, wherein each descriptor includes:
      a completion indicator; and
      data associated with an input/output request;
   a plurality of address holders associated with the input/output processor, wherein each of the plurality of address holders is uniquely affiliated with one of the plurality of descriptors;
   a first connector between the tail descriptor and address holder;
   a second connector between the input/output processor and the head descriptor; and
   a polling mechanism for evaluating the completion indicator of the head descriptor, wherein
      said host is to interface with the head descriptor.

2. The apparatus as in claim 1, wherein the plurality of descriptors is arranged in a linked list format.

3. The apparatus as in claim 1, wherein the host processor includes a descriptor remover for removing the head descriptor.

4. The apparatus as in claim 1, wherein the plurality of address holders is arranged in a first-in-first out format.

5. The apparatus as in claim 1, wherein the plurality of address holders is a set of memory mapped registers.

6. The apparatus as in claim 1, wherein the data associated with an input/output request includes information regarding the type of input/output device to be utilized.

7. A method for input/output processing, comprising:
   creating a first descriptor by a host, wherein the first descriptor includes information associated with a first input/output request and a first completion indicator;
   linking the first descriptor to a preexisting second descriptor, wherein the second descriptor includes information associated with a second input/output request and a second completion indicator and wherein the first descriptor and the second descriptor are stored in a cache memory of an input/output processor;
   placing a first memory address associated with the first descriptor in a first address holder;
   processing a second memory address located in a second address holder and associated with a second data descriptor;
   processing the second input/output request;
   activating the second completion indicator; and
   removing the second descriptor by said host.

8. The method as in claim 7, wherein the first address holder and the second address holder are located in an input/output device.

9. The method as in claim 7, wherein the first address holder and the second address holder are memory mapped registers.

10. The method as in claim 7, wherein the linking the first descriptor to a second descriptor is accomplished using an NGIO interface.

11. The method as in claim 7 further comprising:

processing the first memory address;

processing the first input/output request;

activating the first completion indicator; and removing the first descriptor by said host.

12. A method for input/output processing, comprising:

creating, by a host, a first descriptor having a first completion indicator, wherein the first descriptor is associated with a first input/output process;

linking the first descriptor to a preexisting second descriptor having a second completion indicator, wherein the second descriptor is associated with a second input/output process and wherein the first descriptor and the second descriptor are stored in a cache memory of an input/output processor;

interfacing, by said host, with a completion indicator of the second descriptor;

determining whether the second completion indicator indicates whether the second input/output process is complete.

13. The method as in claim 12, further comprising:

if the second completion indicator indicates that the second input/output process is complete, removing the second descriptor.

14. The method as in claim 13, further comprising:

determining whether the first completion indicator indicates if the first input/output process is complete.

15. The method as in claim 12, further comprising:

if the second completion indicator indicates that the second input/output process is not complete, yielding to other processes.

16. The method as in claim 15, wherein the other processes are scheduled and executed by a computer.

17. The method as in claim 15, further comprising:

determining again whether the second completion indicator indicates whether the second input/output process is complete.

* * * * *